US009359652B2

(12) United States Patent  
Charbon et al.

(10) Patent No.: US 9,359,652 B2
(45) Date of Patent: Jun. 7, 2016

(54) THERMAL TREATMENT METHOD FOR MICROMECHANICAL HOROLOGICAL PARTS

(71) Applicant: Nivarox-FAR S.A., Le Locle (CH)

(72) Inventors: Christian Charbon, Chezard-St-Martin (CH); Alexandre Fussinger, Wavre (CH)

(73) Assignee: Nivarox-FAR S.A., Le Locle (CH)

( * ) Notice: Subject to any disclaimer, the term of this patent is extended or adjusted under 35 U.S.C. 154(b) by 669 days.

(21) Appl. No.: 13/657,997

(22) Filed: Oct. 23, 2012

(65) Prior Publication Data

US 2013/0105454 A1    May 2, 2013

(30) Foreign Application Priority Data

Oct. 27, 2011  (EP) ..................... 11186833

(51) Int. Cl.
 *H05B 3/00*  (2006.01)
 *C21D 1/06*  (2006.01)
 *C21D 9/00*  (2006.01)
 *C21D 9/32*  (2006.01)
 *G04D 3/00*  (2006.01)
 *G04B 13/02*  (2006.01)
 (Continued)

(52) U.S. Cl.
CPC ................. *C21D 1/06* (2013.01); *C21D 9/0068* (2013.01); *C21D 9/32* (2013.01); *G04B 13/02* (2013.01); *G04D 3/0082* (2013.01); *C21D 1/08* (2013.01); *C21D 1/09* (2013.01); *C21D 1/10* (2013.01); *Y02P 10/253* (2015.11)

(58) Field of Classification Search
CPC .............. C21D 1/06; C21D 1/08; C21D 1/09; C21D 1/10; C21D 9/0068; C21D 9/32; G04B 13/02; G04D 3/0082

USPC ........................... 219/200; 368/130, 132, 147
See application file for complete search history.

(56) References Cited

U.S. PATENT DOCUMENTS 4,539,461 A  *  9/1985  Benedict et al. .............. 148/565
2007/0227893 A1  10/2007  Saucy
(Continued)

FOREIGN PATENT DOCUMENTS

DE          300 306  A7    6/1992
EP         0 147 190  A1    7/1985
(Continued)

OTHER PUBLICATIONS

European Search Report issued on Apr. 25, 2012 in corresponding European Application No. 11 18 6833 filed on Oct. 27, 2011 (with an English Translation).

(Continued)

*Primary Examiner* — Dana Ross
*Assistant Examiner* — Joseph Iskra
(74) *Attorney, Agent, or Firm* — Oblon, McClelland, Maier & Neustadt, L.L.P.

(57) ABSTRACT

Thermal treatment method for a micromechanical horological component derived from the LIGA method and exhibiting very low thermal inertia, said method including the step which consists in locally heating one area of the micromechanical horological component to increase hardness by local phase modification, the component being heated for a sufficiently short time that only the locally heated area is affected by the thermal treatment, the phase of the untreated portions of the component remaining unchanged.

19 Claims, 1 Drawing Sheet

(51) Int. Cl.
  *C21D 1/08* (2006.01)
  *C21D 1/09* (2006.01)
  *C21D 1/10* (2006.01)

(56) References Cited

U.S. PATENT DOCUMENTS

| | | | |
|---|---|---|---|
| 2007/0237035 A1* | 10/2007 | Helfer et al. | 368/147 |
| 2008/0095968 A1* | 4/2008 | Semon | B23K 26/0635 428/66.1 |
| 2009/0168611 A1* | 7/2009 | Gigandet et al. | 368/130 |
| 2009/0263182 A1* | 10/2009 | Bannier et al. | 403/242 |
| 2011/0062112 A1 | 3/2011 | Saucy | |
| 2011/0303546 A1 | 12/2011 | Saucy | |

FOREIGN PATENT DOCUMENTS

| | | |
|---|---|---|
| EP | 1 186 683 A1 | 3/2002 |
| EP | 1 595 972 A1 | 11/2005 |
| EP | 1 804 195 A1 | 7/2007 |
| EP | 1 835 339 A1 | 9/2007 |
| FR | 2 630 228 A1 | 10/1989 |
| JP | 58-6930 | 1/1983 |
| JP | 58-58271 | 4/1983 |

OTHER PUBLICATIONS

Somuri V. Prasad et al., "LIGA Microsystems: Surface Interactions, Tribology, and Coatings", Journal of Manufacturing Processes, vol. 6, No. 1, 2004, pp. 107-116.

* cited by examiner

THERMAL TREATMENT METHOD FOR MICROMECHANICAL HOROLOGICAL PARTS

This application claims priority from European Patent Application No. 11186833.7 filed Oct. 27, 2011, the entire disclosure of which is incorporated herein by reference.

FIELD OF THE INVENTION

The present invention concerns a thermal treatment method for micromechanical horological parts. More precisely, the invention concerns a thermal treatment method whose object is to locally modify certain physical properties of micromechanical horological parts, such as toothed wheels.

BACKGROUND OF THE INVENTION

Sometimes, in order to meet specific requirements, it is sought to locally modify physical properties, such as the hardness, magnetism or ductility of micromechanical horological parts. This is particularly the case with the LIGA method, which is an increasingly frequently used method within the field of timepiece design. This method allows the mass production of micromechanical parts with quite remarkable precision and with an overall cost which remains compatible with industrial manufacturing requirements. However, as will be seen in detail below, the micromechanical horological parts obtained using the LIGA method sometimes have problems of wear resistance which it is sought to overcome.

The acronym "LIGA" is from German. It is an abbreviation of "Lithographie, Galvanoformung, Abformung" which represent the different steps of the method. In short, the LIGA method used within the field of horology consists in exposing a photosensitive resin deposited on a conductive substrate to UV rays through a photolithographic mask. After the resin has been developed, a galvanisation step is carried out by electroplating, during which metal is deposited in the microstructures which were developed beforehand in the layer of photosensitive resin and whose contours match the shapes of the desired parts. The last step consists in removing the remaining layer of photosensitive resin and separating the components thereby obtained.

Within the field of horology, the LIGA method has now been of interest for several years. However, as will have been understood from the foregoing, one of the constraints imposed by the LIGA method is that the material used must be able to be deposited by electrolysis. Within the field of horology, the first material used was nickel. This material has the advantage of being able to be implemented in the LIGA method. However, it has the drawback of being magnetic in the amorphous state, which makes it difficult to use for horological applications.

The Applicant is currently interested in micromechanical horological parts obtained via the LIGA method using a nickel and phosphorus alloy containing 12% by weight of phosphorus and which will be called "alloy NiP12" below. This alloy NiP12 has the great advantage of being non-magnetic in the amorphous state. However, the hardness of alloy NiP12 parts made by the LIGA method is average, on the order of 580 HV. Problems of wear directly linked to this relatively low hardness appear in certain conditions in these micromechanical horological parts.

Faced with this problem of wear, the Applicant sought to increase the hardness of the gear teeth obtained by the LIGA method. A known technique in the field of manufacturing solid mechanical parts, for example for the aeronautic or automobile industry, consists in locally heating the gear teeth. It is known, however, that although localised heating of solid parts, for example using a laser beam, has the effect of increasing the hardness of the heated zones, the heating is accompanied by a weakening of the zones thus treated. However, in the field of manufacturing solid mechanical parts, the thermal inertia of the parts is such that only the directly heated surfaces undergo a phase transformation, while the phase of most of the part keeps its intrinsic features.

However, the same is not true in the field of horological design where the parts commonly have thicknesses on the order of several tens to several hundreds of microns and where dimensions rarely exceed a millimetre.

SUMMARY OF THE INVENTION

It is therefore an object of the present invention to overcome the aforementioned drawbacks by providing a thermal treatment method for micromechanical horological parts which locally modifies the physical properties of said parts without thereby affecting the phase of the untreated portions.

The present invention therefore concerns a thermal treatment method for a micromechanical horological part derived from the LIGA method and having very low thermal inertia, said method including the step which consists in locally heating one area of the micromechanical horological component to increase the hardness thereof by local phase modification, wherein the component is heated for a sufficiently short time that only the locally heated area is affected by the thermal treatment, and the phase of the untreated portions of the component remains unchanged.

Owing to these features, the method according to the invention modifies the hardness of micromechanical horological components in a very localised manner by local phase modification of the heated area, without this modification of the physical properties affecting the phase of the untreated portions of the component.

For example, the invention therefore enables the hardness of a micromechanical horological component to be increased in a very localised manner without thereby affecting the phase of the untreated portion of said component. This point is very critical since it is known that, although a thermal treatment has the effect of hardening the heated area of the component, the corollary of the treatment is that the heated area is made more fragile. Consequently, it is essential only to heat the area of the component whose hardness is required to be increased, to avoid weakening the component as a whole.

Having set this objective, the Applicant subjected the teeth of a gear made by NiP12 electroforming or electroplating via the LIGA method to a localized or point heat source, for example a laser.

To the great surprise of the Applicant, it was observed that provided the gear teeth were heated locally for a short period of time, it is possible to substantially increase the hardness of the teeth without thereby affecting the phase of the untreated portion of the gear. This result is all the more remarkable given that it is clear that the thermal inertia of this type of gear is low relative to its dimensions and the high temperatures reached by the laser beam.

This result is confirmed by a crystallographic analysis of a gear enabling the phase transformation caused by heating to be observed. Indeed, in the heated areas of the gear which is initially in the amorphous state, the nickel and phosphorus components undergo a phase separation and precipitate in the form of nickel and $Ni_3P$. Likewise, the hardness of the heated areas of the gear increases by around 50% relative to the intrinsic hardness of alloy NiP12, while the hardness of the untreated portion of the gear virtually does not vary. Finally, a slight magnetisation of the heated areas of the gear is observed, although this is not detrimental to the proper working of the horological mechanism in which the gear is integrated.

According to a complementary feature, the method according to the invention applies to any type of micromechanical horological part derived from the LIGA method and made in a material selected from the group formed of nickels and nickel and phosphorus, tungsten or iron alloys, and micromechanical horological parts derived from conventional methods and made in materials that can undergo a tempering treatment, such as carbon steels or alloys with structural hardening, such as copper/beryllium alloys.

According to another feature of the invention, the following can be used: a laser beam, an induction heating system, a micro blowpipe operating, for example in accordance with the principle of hydrolysis and the recombination of hydrogen and oxygen components of water, or any other system for applying high density energy very locally to locally harden the component. By way of example, it is also possible to envisage locally heating the component either by contact between a small element, such as a preheated rod, and the part to be treated, or by radiation by bringing the preheated element into proximity with the area to be treated.

BRIEF DESCRIPTION OF THE DRAWINGS

Other features and advantages of the present invention will appear more clearly from the following detailed description of an implementation of the method according to the invention, this example being given purely by way of non-limiting illustration with reference to the annexed drawing, in which.

DETAILED DESCRIPTION OF THE PREFERRED EMBODIMENTS

The present invention proceeds from the general inventive idea which consists in briefly heating a micromechanical component in a very localised manner in order to modify the hardness of the heated area. A "micromechanical horological component" means any type of part such as a gear, toothed wheel or other part used in a timepiece movement and obtained either by conventional methods for shaping materials that can undergo a tempering treatment, or by the LIGA method. It was, in fact, realised, during certain ageing tests, that nickel/phosphorus components with 12% by weight of phosphorus obtained by the LIGA method exhibited abnormally fast wear. To overcome this problem, it was envisaged to harden these components such as gears in the areas where they were in contact with adjacent components. However, the only known technique for increasing the hardness of mechanical components consists in locally heating these components. Although heating these components increases their hardness, this is accompanied by a weakening of the heated areas. This technique is successfully used for solid parts intended, for example, for the aeronautic or automobile industry. Indeed, given their dimensions, these solid parts exhibit sufficiently high thermal inertia that only the heated areas are affected by the thermal treatment, with the phase of the untreated portion of the part remaining unchanged. However, the same is not true within the field of horology where components are of very small dimensions and exhibit very low thermal inertia. Despite this, the Applicant, going against these prejudices, realised that by heating micromechanical horological components in a very localised manner and for a very short time, it was possible to increase the hardness of the heated areas without affecting the phase of the untreated portion of the horological components and thus their mechanical wear. In the particular case of a toothed wheel made of a nickel and phosphorus alloy with 12% by weight of phosphorus, the Applicant observed that localised heating of the end of the gear teeth was accompanied by phase transformation. Indeed, the alloy which is initially in the amorphous state undergoes a phase separation with precipitation of the nickel and phosphorus components in the form of nickel and $NI_3P$. In parallel, this phase transformation is accompanied by an increase in the hardness of the heated areas by a factor of approximately 2. It is also clear from this latter indication that it is not possible to envisage the hardness of the gear increasing in these proportions in the entire volume of the part, otherwise the parts could no longer be mounted using the conventional driving in techniques without a risk of breakage. Finally, a slight magnetisation of the locally heated functional areas of the components is observed, although this does not reach harmful values.

Figure 1:
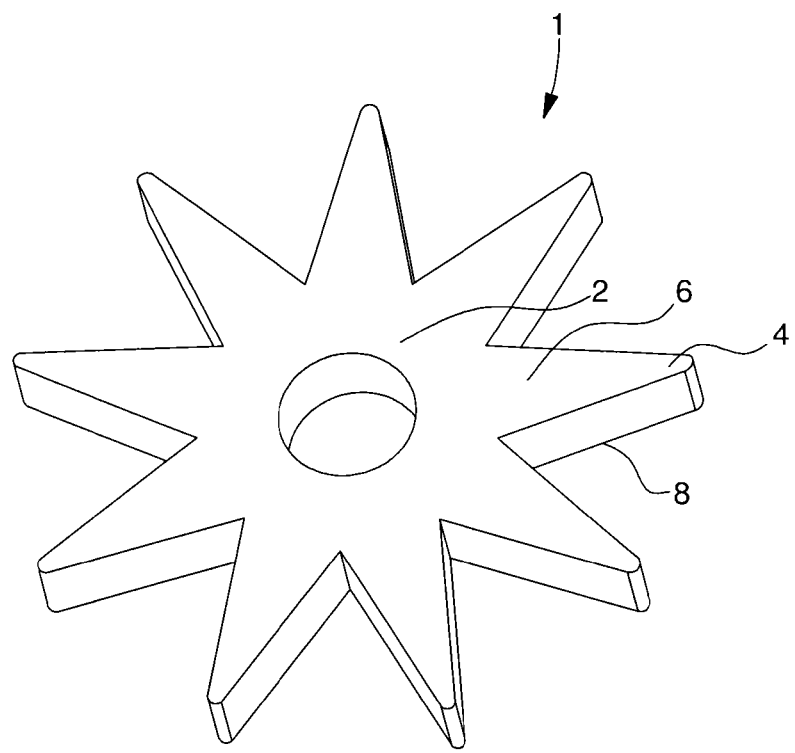
FIG. 1 is a perspective view of a horological component made by electroforming NiP12 in accordance with the LIGA method.

FIG. 1 is a top view of the part of a horological component made by electroplating or electrofirming NiP12 in accordance with the LIGA method. In the illustrated example, the horological component is a wheel. Designated as a whole by the general reference numeral 1, this wheel includes a hub 2, from which a plurality of regularly spaced teeth 4 extend radially. This wheel 1 includes a top surface 6 and a bottom surface 8.

The table below summarises the Vickers hardness measurements carried out at different points of wheel 1, illustrated in FIG. 1. These hardness measurements were carried out on the top 6 and bottom 8 surfaces of two different parts of identical geometry obtained by electroplating NiP12 in accordance with the LIGA method.

| Measuring point | Part 1 | | Part 2 | |
| --- | --- | --- | --- | --- |
| | Top | Bottom | Top | Bottom |
| Tooth 4 | 1020 | 998 | 996 | 1010 |
| Hub 2 | 613 | 607 | 605 | 607 |

The hardness of amorphous NiP12 after the LIGA method but prior to thermal treatment is 590 HV +/−30 HV. It is observed that the hardness of hub 2 of wheel 1 after the thermal treatment according to the invention is comprised between 605 and 613 HV depending upon the part concerned and whether the measurement was taken on the top surface or bottom surface of the part. It is thus clear that, in light of the above results, the hardness of hub 2 of wheel 1 was in no way affected by the thermal treatment to which teeth 4 of wheel 1 were subjected. However, the hardness of a tooth 4 after the end thereof has been thermally treated by means of a laser beam is comprised, depending upon the part concerned and whether the measurement was taken on the top surface or bottom surface of tooth 4, between 996 and 1020 HV, which constitutes an increase of around 50% in the hardness of the end of the tooth relative to the hardness of the amorphous material directly derived from the LIGA method and not thermally treated.

It is thus observed, in light of the foregoing, that the hardness of the thermally treated areas increases in a ratio of around 50% relative to the NiP12 material in amorphous phase obtained immediately from the LIGA method. It will be noted that the structural change of the NiP12 material from an amorphous state after electrodeposition to a state in which it undergoes a phase separation with precipitation of the nickel and phosphorus components in the form of nickel and $Ni_3P$ is observed from 200° C.

It goes without saying that this invention is not limited to the implementation that has just been described and that various simple alterations and variants can be envisaged by those skilled in the art without departing from the scope of the invention as defined by the annexed claims. In particular, it is possible to envisage heating the components such as wheels by induction. In this case, a ring is used, which is placed on the wheel and whose diameter matches the external diameter of the wheel, then an alternating current is made to flow in the ring.

The inventive merit of the Applicant is having been able to go against the prejudices of the state of the art. Indeed, it is known that to increase the hardness of functional areas of solid parts, these areas can be heated. However, the heating is accompanied by a weakening and magnetisation of the heated areas. In the case of solid parts, this is not, however, a problem since the entire volume of the part is not affected. The same cannot be said of micromechanical horological components whose dimensions and density are low and which, it might be thought, would be affected by the thermal treatment even in the untreated portions thereof. Quite the contrary, the Applicant succeeded in demonstrating not only that localised heating of the functional areas of a horological component, such as a wheel, was possible, but also that this heating was only accompanied by a hardening of the heated areas, while the primitive phase was preserved in the untreated portions of the component. The result of the invention is a horological component whose functional areas are hardened and thus more resistant with a hub which remains ductile and which can therefore be assembled by driving in using conventional techniques.

Naturally, it will be understood that depending upon specific requirements, it may be sought to modify other physical properties of horological components. One may, for example, wish to make a component locally magnetic, or modify the ductility of said component, either by increasing or decreasing said ductility. It should be understood that the inventive contribution of the invention is not simply a localised increase in the hardness of micromechanical horological components, but that this contribution very broadly concerns the localised and controlled modification of the physical properties of such components by thermal treatment.

Figure 2:
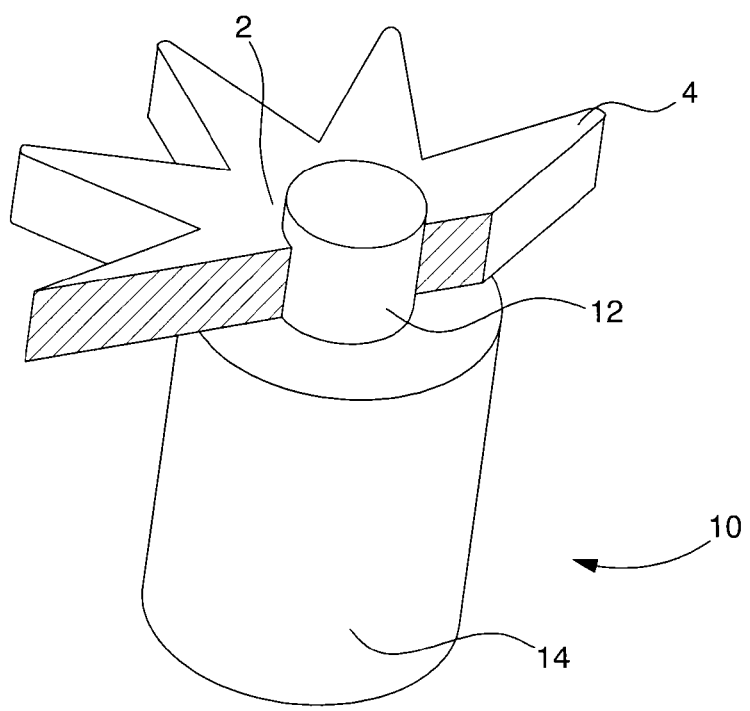
FIG. 2 is a perspective view of the horological component of FIG. 1 mounted on a fitting for implementing the method of the invention.

To implement the method according to the invention, a fitting 10 illustrated in FIG. 2 may be used. This fitting 10 takes the form of a staged cylinder with a first portion 12 whose external diameter substantially matches the internal diameter of the hub 2 of wheel 1, and with a second portion 14 whose external diameter is greater than that of the first portion 12 so that wheel 1 can be supported. In the Applicant's opinion, this fitting 10 plays a part in the success of implementing the method according to the invention. Indeed, in the case of the toothed wheel 1 illustrated in FIG. 2, the dimensions of teeth 4 are small relative to those of hub 2 of wheel 1, so that the hub 2 of wheel 1 plays the part of a heat sink and the heat is diffused in fitting 10. Thus, the temperature of hub 2 of wheel 1 never reaches values that could cause a phase transformation and concomitant increase in hardness.

What is claimed is:

1. A thermal treatment method for a micromechanical horological component derived from the LIGA method and exhibiting very low thermal inertia, said method including:
   locally heating an area of the micromechanical horological component to increase the hardness of the component by local phase modification, wherein the local heating is performed for a time sufficient to only affect the locally heated area and the phase of the untreated portions of the component remain unchanged,
   wherein the micromechanical horological part derived from the LIGA method is made of nickel, a nickel and phosphorus alloy, a nickel and tungsten alloy, or a nickel and iron alloy, and
   wherein the hardness of the component that is locally heated increases by a factor of about 2.

2. The method according to claim 1, wherein, in order to locally harden the component, a laser beam, an induction heating system, a micro blowpipe, or a preheated element which locally heats the component either by direct contact or by radiation is employed to increase the hardness of the component by local phase modification.

3. The method according to claim 1, wherein the area of the component that is locally heated is brought to a temperature of at least 200° C.

4. The method according to claim 2, wherein the area of the component that is locally heated is brought to a temperature of at least 200° C.

5. The method according to claim 1, wherein, to implement the method, the micromechanical horological component is placed on a fitting in which the heat induced by the heating is diffused.

6. The method according to claim 1, wherein the micromechanical horological part derived from the LIGA method is made of a nickel and phosphorus alloy.

7. The method according to claim 1, wherein nickel and phosphorus alloy is NiP12.

8. A thermal treatment method for a micromechanical horological component derived from the LIGA method and exhibiting very low thermal inertia, said method including:
   locally heating an area of the micromechanical horological component to increase the hardness of the component by local phase modification, wherein the local heating is performed for a time sufficient to only affect the locally heated area and the phase of the untreated portions of the component remain unchanged,
   wherein the micromechanical horological part derived from the LIGA method is made of a nickel and tungsten alloy.

9. A thermal treatment method for a micromechanical horological component derived from the LIGA method and exhibiting very low thermal inertia, said method including:
   locally heating an area of the micromechanical horological component to increase the hardness of the component by local phase modification, wherein the local heating is performed for a time sufficient to only affect the locally heated area and the phase of the untreated portions of the component remain unchanged,
   wherein the micromechanical horological part derived from the LIGA method is made of a nickel and iron alloy.

10. A thermal treatment method for a micromechanical horological component derived from the LIGA method and exhibiting very low thermal inertia, said method including:
    locally heating an area of the micromechanical horological component to increase the hardness of the component by local phase modification, wherein the local heating is performed for a time sufficient to only affect the locally heated area and the phase of the untreated portions of the component remain unchanged, wherein the micromechanical horological part derived from the LIGA method is made of nickel, a nickel and phosphorus alloy, a nickel and tungsten alloy, or a nickel and iron alloy, and wherein the horological component derived from the LIGA method is amorphous and non-magnetic.

11. The method according to claim 8, wherein, in order to locally harden the component, a laser beam, an induction heating system, a micro blowpipe, or a preheated element which locally heats the component either by direct contact or by radiation is employed to increase the hardness of the component by local phase modification.

12. The method according to claim 9, wherein, in order to locally harden the component, a laser beam, an induction heating system, a micro blowpipe, or a preheated element which locally heats the component either by direct contact or by radiation is employed to increase the hardness of the component by local phase modification.

13. The method according to claim 10, wherein, in order to locally harden the component, a laser beam, an induction heating system, a micro blowpipe, or a preheated element which locally heats the component either by direct contact or by radiation is employed to increase the hardness of the component by local phase modification.

14. The method according to claim 8, wherein the area of the component that is locally heated is brought to a temperature of at least 200° C.

15. The method according to claim 9, wherein the area of the component that is locally heated is brought to a temperature of at least 200° C.

16. The method according to claim 10, wherein the area of the component that is locally heated is brought to a temperature of at least 200° C.

17. The method according to claim 8, wherein, to implement the method, the micromechanical horological component is placed on a fitting in which the heat induced by the heating is diffused.

18. The method according to claim 9, wherein, to implement the method, the micromechanical horological component is placed on a fitting in which the heat induced by the heating is diffused.

19. The method according to claim 10 wherein, to implement the method, the micromechanical horological component is placed on a fitting in which the heat induced by the heating is diffused.

* * * * *